(12) United States Patent
Tanaka (10) Patent No.: US 9,385,516 B2
(45) Date of Patent: Jul. 5, 2016

(54) CONNECTOR

(71) Applicant: Sumitomo Wiring Systems, Ltd., Yokkaichi, Mie (JP)

(72) Inventor: Yukari Tanaka, Mie (JP)

(73) Assignee: SUMITOMO WIRING SYSTEMS, LTD. (JP)

( * ) Notice: Subject to any disclaimer, the term of this patent is extended or adjusted under 35 U.S.C. 154(b) by 0 days.

(21) Appl. No.: 14/538,905

(22) Filed: Nov. 12, 2014

(65) Prior Publication Data

US 2015/0144395 A1 May 28, 2015

(30) Foreign Application Priority Data

Nov. 27, 2013 (JP) .................................. 2013-244729

(51) Int. Cl.
| | |
|---|---|
| *H02G 15/007* | (2006.01) |
| *H02G 15/013* | (2006.01) |
| *H02G 3/22* | (2006.01) |
| *H01R 13/436* | (2006.01) |
| *H01R 13/74* | (2006.01) |
| *H01R 13/422* | (2006.01) |
| *H01R 13/52* | (2006.01) |

(52) U.S. Cl.
CPC ............. *H02G 3/22* (2013.01); *H01R 13/4367* (2013.01); *H01R 13/748* (2013.01); *H01R 13/4223* (2013.01); *H01R 13/5208* (2013.01)

(58) Field of Classification Search
CPC ............................ H02G 15/007; H02G 15/013
USPC ............................................................ 174/668
See application file for complete search history.

(56) References Cited

U.S. PATENT DOCUMENTS

| | | | | |
|---|---|---|---|---|
| 1,967,480 A | * | 7/1934 | Ruther | .................... H01T 13/04 123/169 PH |
| 6,528,728 B1 | * | 3/2003 | Shima | .................. H02G 3/0437 174/101 |
| 2013/0333944 A1 | * | 12/2013 | Sakakura | ........... H01R 13/5804 174/74 R |

FOREIGN PATENT DOCUMENTS

JP 2011-175775 9/2011

* cited by examiner

*Primary Examiner* — Timothy Thompson
*Assistant Examiner* — Charles Pizzuto
(74) *Attorney, Agent, or Firm* — Gerald E. Hespos; Michael J. Porco; Matthew T. Hespos (57) ABSTRACT

A connector (10) to be mounted on a case (C) of a device includes a resin housing (30). A shield bracket (50) is fixed to the case (C) to cover the housing (30) and wires (W) are drawn out through a rear opening (51A). Rubber plugs (24) are accommodated in cavities (37) in the housing (30) and seal between inner surfaces of the cavities (37) and the wires (W). A resin back retainer (40) is mounted in a wire draw-out portion (32) of the housing (30) to be arranged in a tubular portion (51) of the shield bracket (50) with the wires (W) supported and retains the rubber plugs (24). Wire protecting portions (46) are provided at positions of the back retainer (40) at a distance from the wires (W) and project back from the rear end opening (51A) of the shield bracket (50).

4 Claims, 10 Drawing Sheets

CONNECTOR

BACKGROUND

1. Field of the Invention

The invention relates to a connector.

2. Description of the Related Art

Japanese Unexamined Patent Publication No. 2011-175775 discloses a connector to be mounted on a case of a device. The connector includes a housing made of synthetic resin and a wire is drawn out backward from the housing. A shield shell is fixed to the case and covers the housing. A seal is accommodated in a rear part of the housing for sealing between the wire and the housing, and a retainer is mounted in the housing to prevent the seal from coming out backward. The seal retainer is formed so that a part for supporting the wire projects back from an opening on the rear end of the shield shell, and the wire is drawn out backward from this part for supporting the wire.

The wire is bent at a steep angle if a space between the connector and a peripheral device arranged behind the connector is narrow. Thus, it is required to shorten a dimension of a part arranged outside the case in a front-back direction in the connector. The dimension of the part arranged outside the case can be shortened in the front-back direction by shortening a length of the part for supporting the wire in the front-back direction and accommodating the entire part for supporting the wire in the shield shell. However, if the part for supporting the wire is arranged in the shield shell, the wire contacts an end part of the shield shell and can be damaged when being bent.

The invention was completed based on the above situation and an object of the invention is to prevent a wire from being damaged.

SUMMARY OF THE INVENTION

The invention is directed to a connector to be mounted on a case of a device. The connector includes a housing is made of synthetic resin and a wire is drawn out from the housing, a shield bracket which is made of metal and fixed to the case in a state where the shield bracket covers the housing and the wire is drawn out through an opening. A seal is accommodated in the housing and seals between the housing and the wire. A back retainer made of synthetic resin is mounted in the housing to retain the seal and is arranged in the shield bracket in a state where the wire is supported. A wire protecting portion is provided on the back retainer at a distance from the wire and projects out from an opening of the shield bracket. Accordingly, a part for supporting the wire is arranged in the shield bracket and the wire protecting portion projects out through the opening of the shield bracket. Thus, the wire can be bent without being brought into contact with the shield bracket, thereby preventing the wire from being damaged by contact with the shield bracket.

The wire can be bent about a support in the shield bracket. Thus, the wire can be bent at a moderate angle and a load on the wire can be reduced.

The wire protecting portion may be integral or unitary with the back retainer. Thus, an increase in the number of components of the connector can be prevented since it is not necessary to provide a separate wire protecting portion in addition to the back retainer.

The wire protecting portion may be provided along an edge of the opening of the shield bracket. Thus, the wire contacts the wire protecting portion regardless of the bending direction of the wire, and the shield bracket will not damage the wire.

The housing may include a wire draw-out portion from which the wire is drawn out backward, and a front stop may be provided on an edge of the opening of the shield bracket that contacts a rear end of the wire draw-out portion. The front stop projects inward and stops the shield bracket in front with respect to the housing. This design prevents the wire from being damaged by the front stop because the wire protecting portion is on the back retainer and the front stop of the shield bracket is arranged around the wire draw-out portion from which the wire is drawn out to.

DETAILED DESCRIPTION OF THE PREFERRED EMBODIMENTS

A connector in accordance with an embodiment of the invention is illustrated in FIGS. 1 to 10 and is identified generally by the numeral 10. The connector 10 is to be mounted on a metal case C of a device to be installed in a vehicle in this embodiment. In the following description, a vertical direction is based on that in FIG. 3 and a lateral direction is based on that in FIG. 3. Further, a front-back direction is based on a lateral direction in FIGS. 4 and 5 and an end to be mounted in the case C is referred to as the front.

Figure 4:
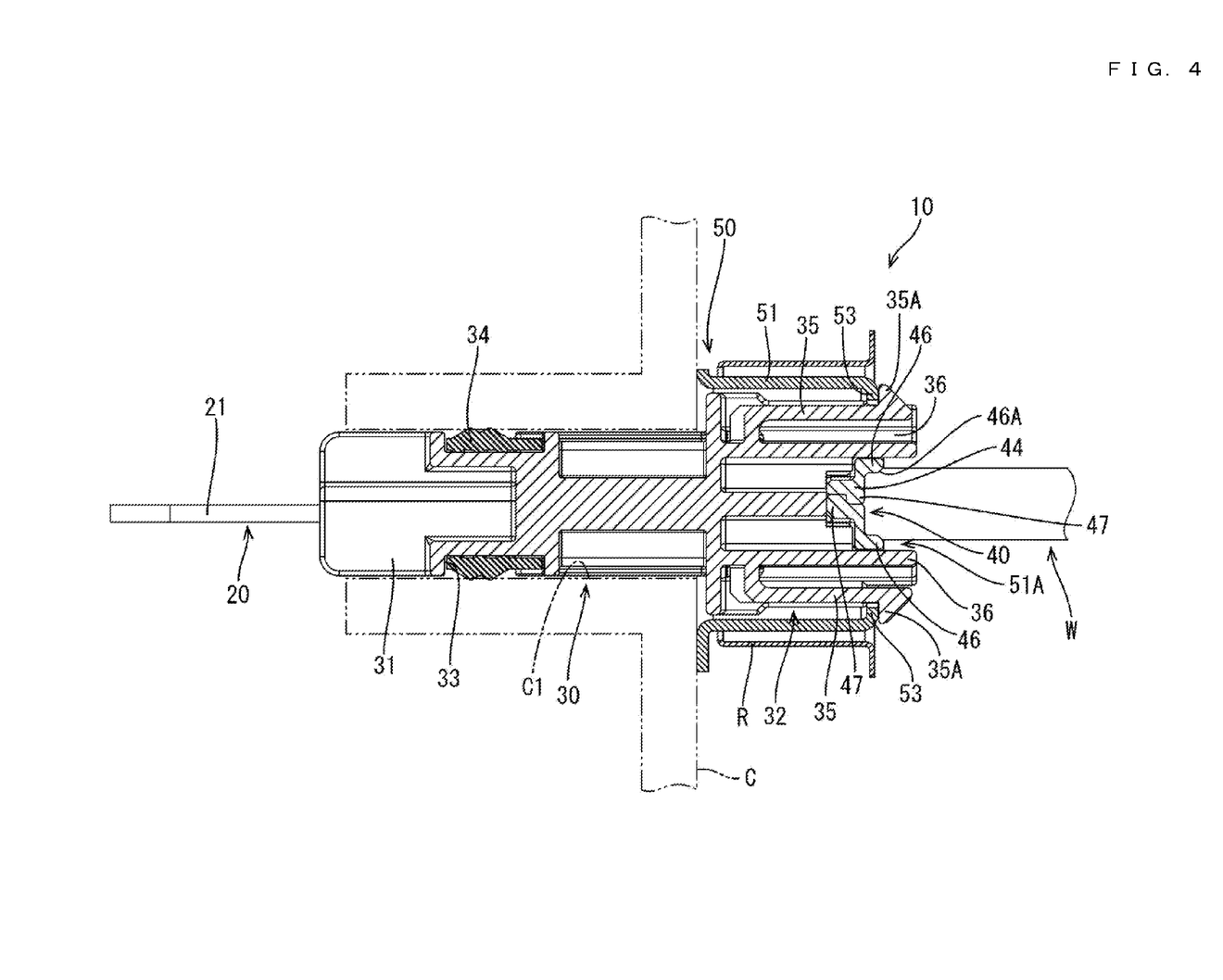
FIG. 4 is a section along A-A of FIG. 3.
Figure 5:
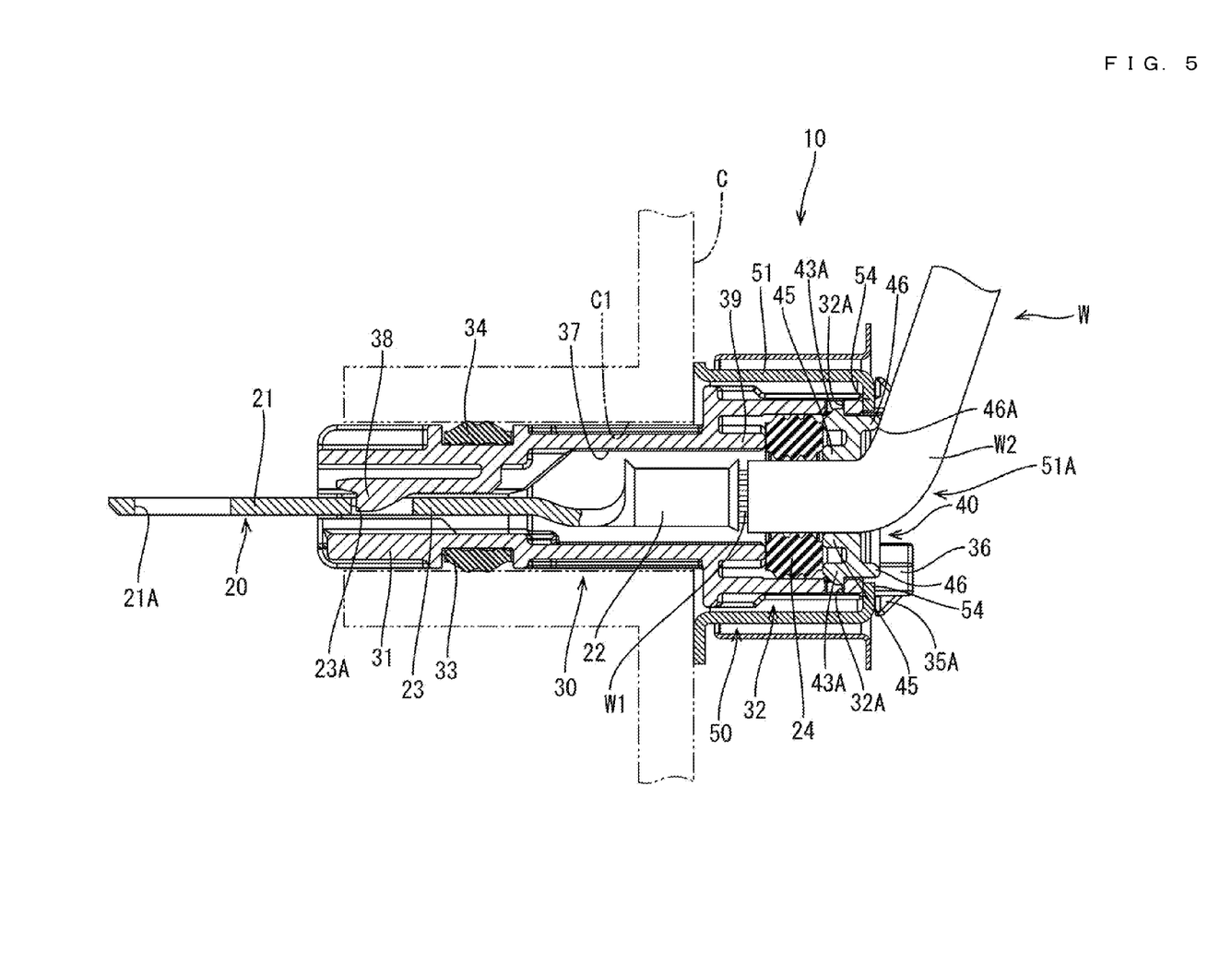
FIG. 5 is a section, corresponding to a cross-section along B-B of FIG. 3, showing a state where wires drawn out backward from the connector are bent upwardly.

As shown in FIGS. 4 and 5, the connector 10 includes terminals 20 that are connected to ends of wires W, a housing 30 that holds the terminals 20 so that the wires W are drawn out backward from the housing, and a shield bracket 50 that is fixed to the case C while covering a rear part of the housing 30.

Figure 1:
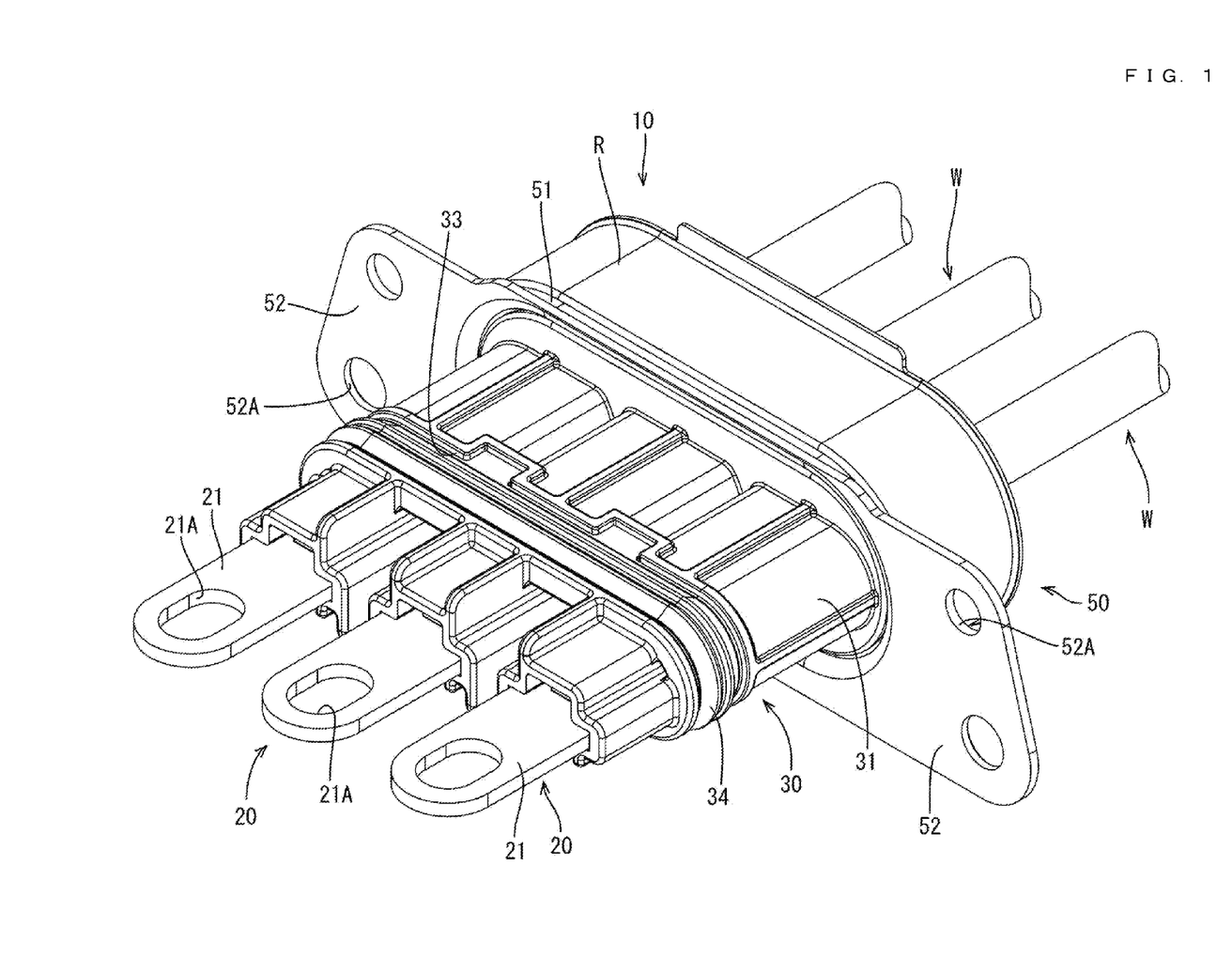
FIG. 1 is a perspective view of a connector when viewed obliquely from front.
Figure 6:
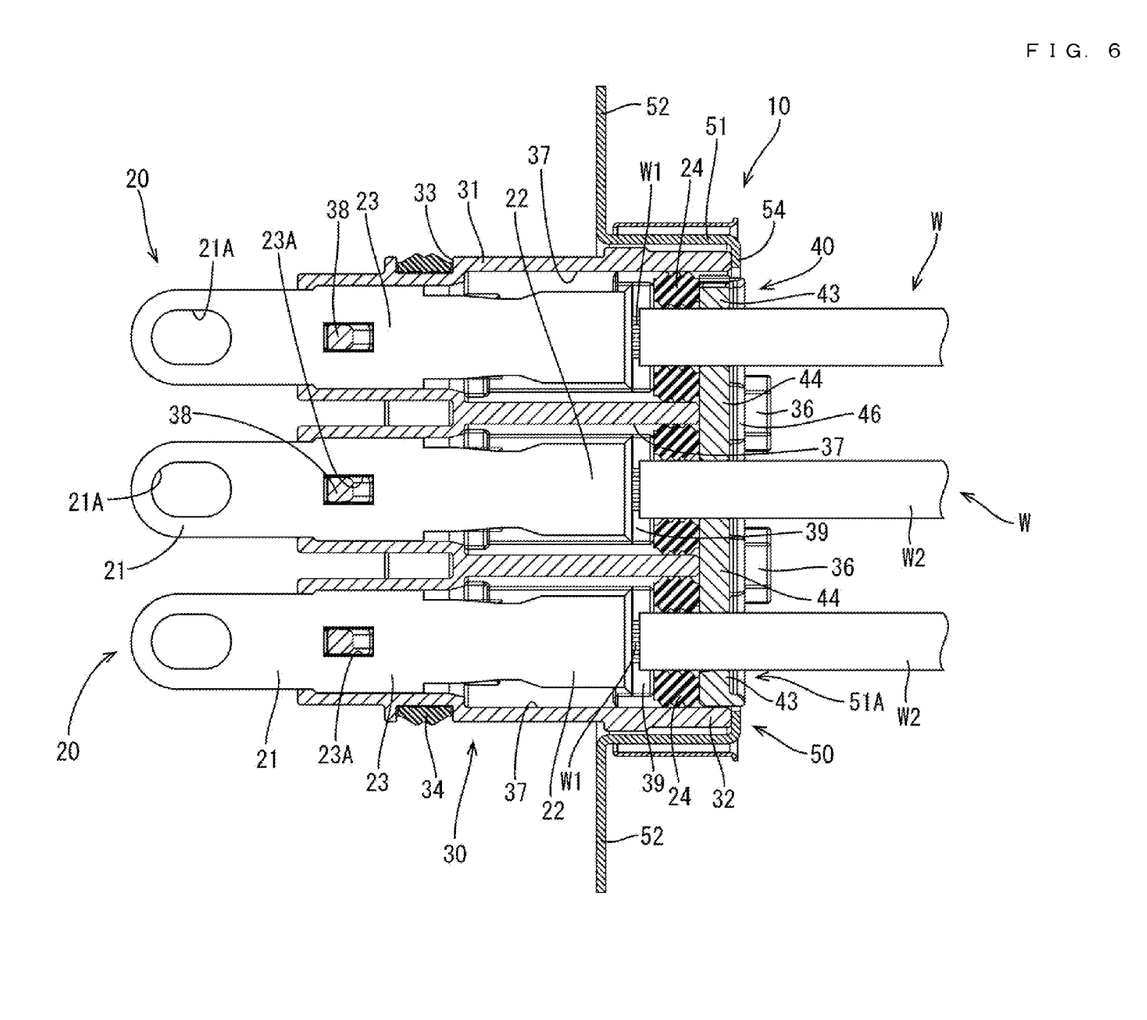
FIG. 6 is a section along C-C of FIG. 3.
Figure 7:
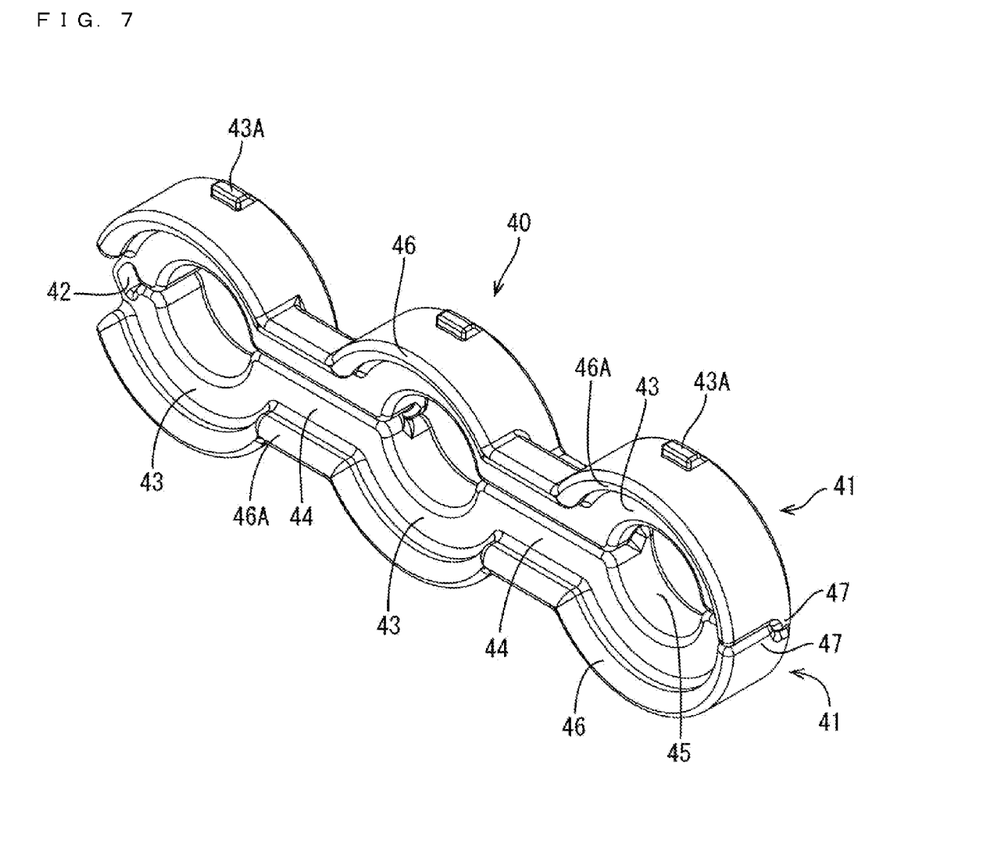
FIG. 7 is a perspective view of a back retainer when viewed obliquely from behind.
Figure 8:
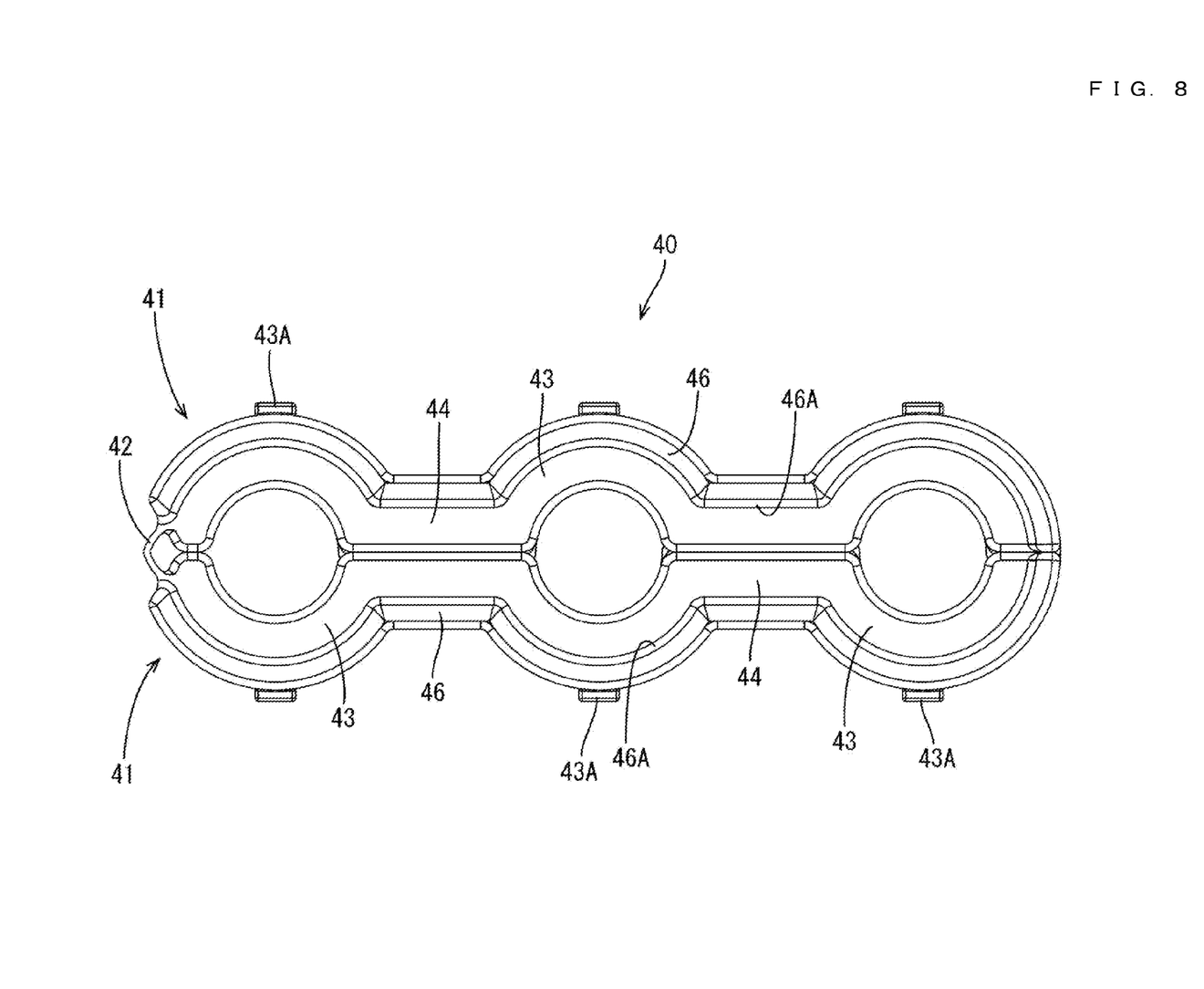
FIG. 8 is a rear view of the back retainer.

Each terminal 20 is formed by press-working a metal plate material. Further, as shown in FIGS. 1, 5 and 6, each terminal 20 includes a device-side connecting portion 21 including a round hole 21A penetrating in a plate thickness direction and to be connected to a device (not shown) in the case C, a wire connecting portion 22 to be connected to the wire W and a link 23 linking the device-side connecting portion 21 and the wire connecting portion 22 in the front-back direction.

The wire W has a core W1 covered with an insulation coating W2. The insulation coating W2 is removed at an end of the wire W to expose the core W1. The wire connecting portion 22 of the terminal 20 is crimped to the exposed core W1 so that the terminal 20 is connected to the end of the wire W.

The housing 30 is made of synthetic resin and is wide and flat in the lateral direction and long in the front-back direction, as shown in FIGS. 1 and 4 to 6. An inserting portion 31 is formed at a front part of the housing 20 and is insertable into a mounting hole C1 on the case C. A wire draw-out portion 32 is formed behind the inserting portion 31 and accommodates the wires W that are drawn out backward.

A mounting groove 33 is provided circumferentially on the outer peripheral surface of the inserting portion 31 and a seal ring 34 is mounted therein. The seal ring 34 closely contacts the inner peripheral surface of the mounting hole C1 to seal between the inserting portion 31 and the inner peripheral surface of the mounting hole C1 when the inserting portion 31 is inserted into the mounting hole C1, as shown in FIGS. 4 and 5.

As shown in FIGS. 4 and 5, the wire draw-out portion 32 is expanded vertically more than the inserting portion 31 and is vertically larger than the mounting hole C1 of the case C. Lock pieces 35 are provided on the upper and lower surfaces of the wire draw-out portion 32 and are resiliently displaceable toward a radially inner side of the wire draw-out portion 32. Each lock piece 35 is cantilevered back along an extending direction of the wire draw-out portion 32 from an outer surface of the wire draw-out portion 32. A locking claw 35A projects out on a rear end part of each lock piece 35 for locking a tubular portion 51 of the shield bracket 50 from behind, as described later.

Figure 3:
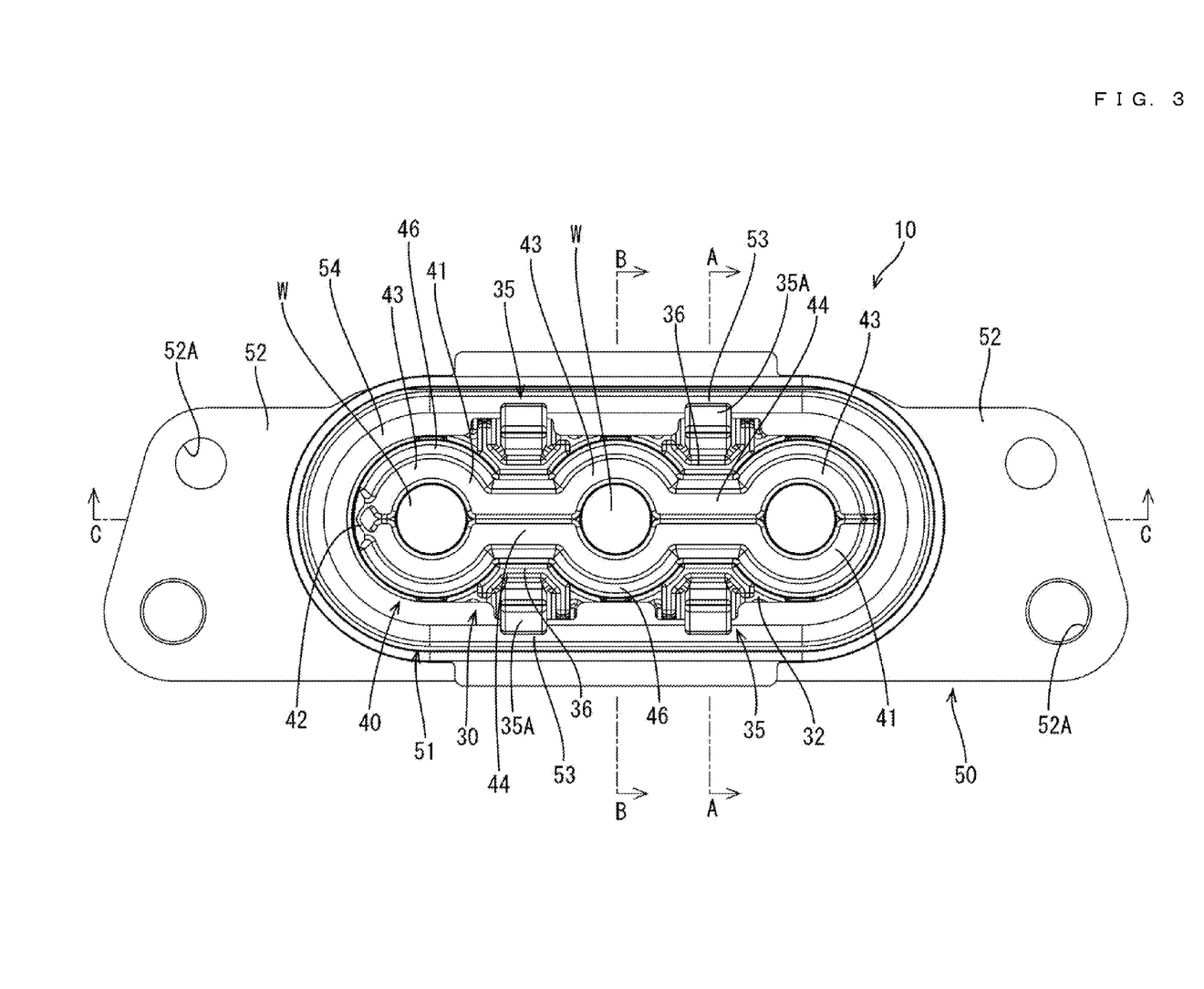
FIG. 3 is a rear view of the connector.

As shown in FIGS. 3 and 4, an excessive deflection preventing wall 36 is provided at an inner side of each lock piece 35 in the wire draw-out portion 32 for preventing the lock piece 35 from being deflected excessively inward. The excessive deflection preventing wall 36 extends in the front-back direction along an extending direction of the lock piece 35, and prevents the excessive deflection of the lock piece 35 to prevent damaging contact of the lock piece 35 when the lock piece 35 is displaced inward.

As shown in FIGS. 4 to 6, cavities 37 are provided from the inserting portion 31 to the wire draw-out portion 32 in the housing 30 and the terminals 20 connected to the wires W are accommodated therein from behind.

Each cavity 37 penetrates through the housing 30 in the front-back direction and the terminal 20 is accommodated in the cavity 37 so that the device-side connecting portion 21 of the terminal 20 projects forward from the inserting portion 31. Further, as shown in FIG. 5, a locking lance 38 is cantilevered forward from the upper surface of each cavity 37. The locking lance 38 is fit into a lance hole 23A on the link 23 of the terminal 20 to hold the terminal 20 in the cavity 37.

As shown in FIGS. 4 to 6, a rubber plug 24 is fit externally on each wire W and is accommodated in a rear end part of each cavity 37. The rubber plugs 24 are stopped in front by front stop projections 39 in the cavities 37 when being accommodated in the wire draw-out portion 32. Further, the rubber plugs 24 stopped in front closely contact the outer peripheral surfaces of the wires W and the inner peripheral surfaces of the cavities 37, thereby sealing between the housing 30 and the wires W.

A back retainer 40 made of synthetic resin is mounted behind the rubber plugs 24 in the wire draw-out portion 32 for preventing the rubber plugs 24 from coming out backward.

As shown in FIGS. 7 to 10, the back retainer 40 is formed by vertically assembling a pair of half bodies 41 with each other, and end parts of the respective half bodies 41 on one side are joined unitarily by a hinge 42. Further, the back retainer 40 includes supports 43 for supporting each wire W and couplings 44 for integrally coupling the supports 43 side by side in the lateral direction.

The support 43 is substantially circular for surrounding the wire W over the entire circumference. When the half bodies 41 are assembled with each other, the supports 43 support the wires W by vertically sandwiching them, as shown in FIGS. 3 and 5. Contact ribs 45 are provided on the front surface of the support 43 for contacting the rear end surface of the rubber plug 24, as shown in FIG. 5. The contact ribs 45 have an arcuate shape in conformity with the outer peripheral surface of the wire W. When inserted to a proper position into the wire draw-out portion 32, the back retainer 40 contacts the rear end surfaces of the rubber plugs 24 to prevent backward movements of the rubber plugs 24.

The contact ribs 45 and the front stop projections 39 of the wire draw-out portion 32 prevent the rubber plugs 24 from moving in the front-back direction. In this way, a reduction in sealability between the wires W and the wire draw-out portion 32 due to forward and backward displacements of the rubber plugs 24 and the inclination of the rubber plugs 24 can be suppressed.

As shown in FIG. 5, locking projections 43A are provided on opposite upper and lower end parts of the supporting portions 43 and are lockable to locking holes 32A on the top and bottom of the wire draw-out portion 32. The locking projections 43A fit into the locking holes 32A to fix the back retainer 40 to the wire draw-out portion 32 when the back retainer 40 is inserted to the proper position into the wire draw-out portion 32.

As shown in FIGS. 3 and 7 to 10, the couplings 44 extend straight in the lateral direction. The couplings 44 couple ends of the adjacent circular supports 43 when the half bodies 41 are assembled with each other. The rear end surfaces of the couplings 44 are flush with those of the supports 43. Additionally, the rear ends of the supports 43 and the couplings 44 are substantially flush with a rear end of the wire draw-out portion 32 when the back retainer 40 is fixed to the wire draw-out portion 32, as shown in FIG. 5.

Figure 2:
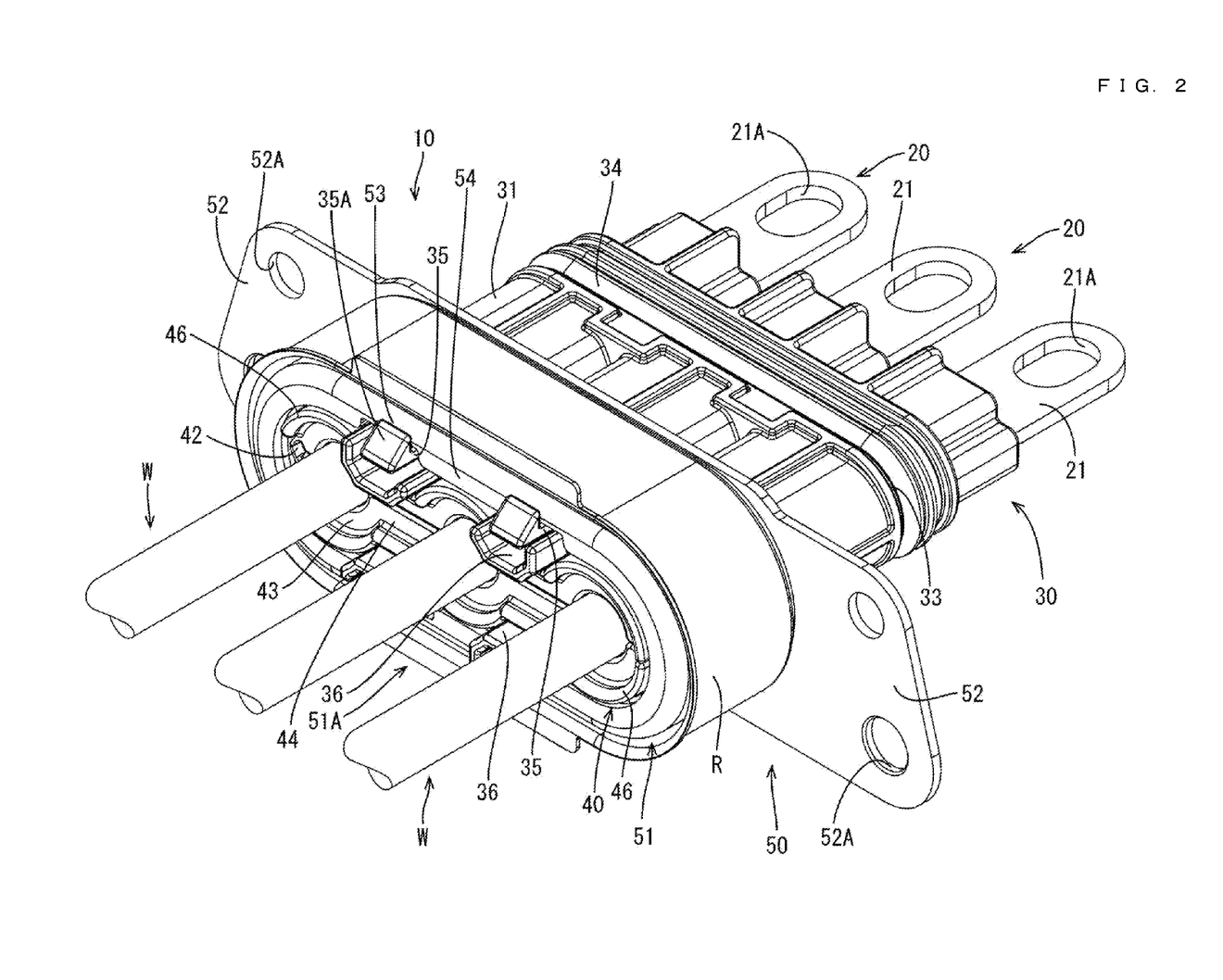
FIG. 2 is a perspective view of the connector when viewed obliquely from behind.

The shield bracket 50 is made of metal and includes the tubular portion 51 and two mounting pieces 52 bulging out toward opposite lateral sides from the front end of the tubular portion 51, as shown in FIGS. 1, 2 and 6. Each mounting piece 52 is a flat plate and upper and lower bolt insertion holes 52A penetrate through each mounting piece 52 in a plate thickness direction. Unillustrated fixing bolts are inserted into the bolt insertion holes 52A and tightened into the case C to fix the shield bracket 50 to the case C and to connect the shield bracket electrically to the case C.

As shown in FIG. 3, the tubular portion 51 is an elliptical tube that is wide in the lateral direction. A tubular braided wire (not shown) collectively covers the wires W drawn out backward from the wire draw-out portion 32 of the housing 30 and is mounted on the outer peripheral surface of the tubular portion 51. The braided wire is connected electrically to the tubular portion 51 by mounting the braided wire on the outer periphery of the tubular portion 51 and caulking an annular caulk ring R from an outer side of the braided wire.

As shown in FIG. 4, locked portions 53 are provided at positions of an edge of a rear opening 51A of the tubular portion 51 corresponding to the lock pieces 35 of the wire draw-out portion 32 and are locked from behind by the locking claws 35A of the lock pieces 35. The locking claws 35A move onto the locked portions 53 in the process of inserting the wire draw-out portion 32 into the tubular portion 51 and the lock pieces 35 displace inward. The lock pieces 35 resiliently restore when the wire draw-out portion 32 is inserted to a proper position in the tubular portion 51 and the locking claws 35A lock the engaged portions 53 from behind. In this way, the shield bracket 50 is prevented from coming off backward with respect to the wire draw-out portion 32.

A front stop 54 is provided on an edge of the rear end opening 51A of the tubular portion 51 and contacts the rear end opening of the wire draw-out portion 32 from behind to stop the shield bracket 50 with respect to the housing 30, as shown in FIG. 5. Specifically, as shown in FIGS. 3 and 5, the front stop 54 is provided at the the rear end 51A of the tubular portion 51, except on parts where the locked portions 53 are provided, and is bent in from the end of the rear end 51A to bulge more inward than the locked portions 53. Further, as shown in FIGS. 4 to 6, an inner peripheral shape of the front stop 54 is substantially the same as that of the rear end opening of the wire draw-out portion 32. When the wire draw-out portion 32 is inserted to the proper position into the tubular portion 51, the front stop 54 contacts the rear end opening of the wire draw-out portion 32 from behind to stop the shield bracket 50 with respect to the wire draw-out portion 32.

As shown in FIGS. 2 to 6, wire protecting portions 46 project backward from outer peripheral edges of the rear end surfaces of the supports 43 and the couplings 44 of the back retainer 40. The wire protecting portion 46 extends continuously in the lateral direction on the rear end surfaces of the supports 43 and the couplings 44 along an outer periphery of each half body 41 as shown in FIGS. 2 to 10 and projects farther backward than the front stop 54 on the tubular portion 51 of the shield bracket 50, as shown in FIGS. 5 and 6. Further, a corner part of the wire protecting portion 46 at the side of the wires W is chamfered into a curved surface 46A.

More particularly, the wire protecting portions 46 are formed over substantially the entire circumference on the outer peripheral edge of the back retainer 40 and are arranged to extend along the inner edge of the front stop 54 of the tubular portion 51 while avoiding the lock pieces 35, as shown in FIG. 3, when the back retainer 40 is mounted in the wire draw-out portion 32.

Figure 9:
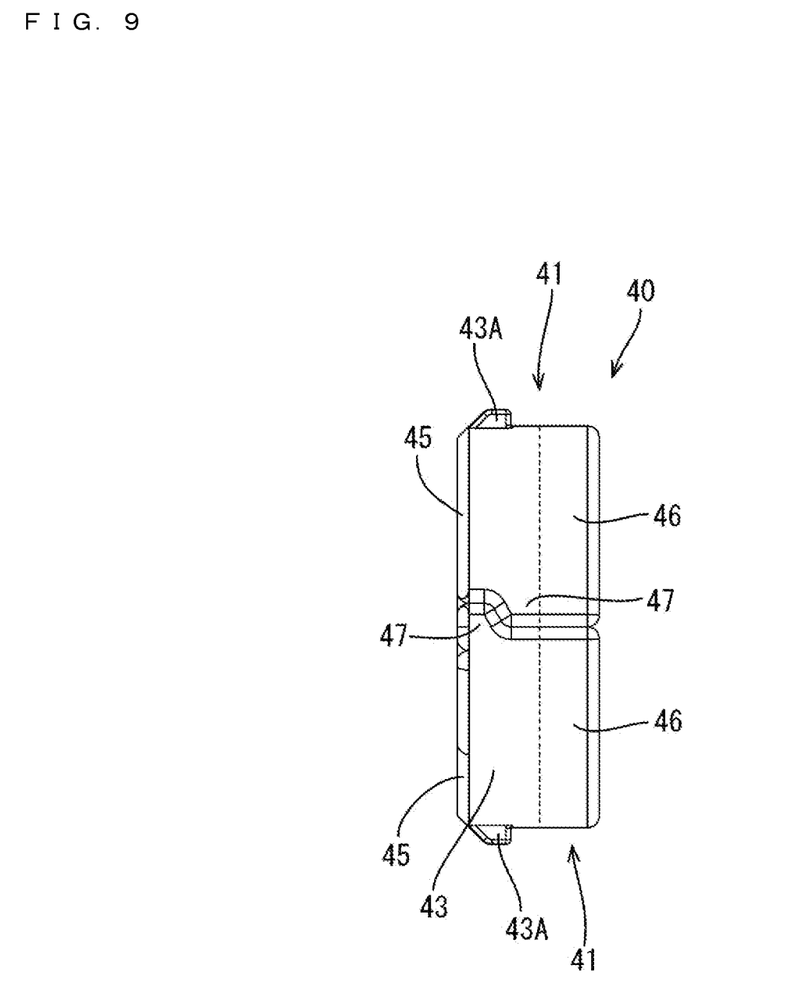
FIG. 9 is a side view of the back retainer.
Figure 10:
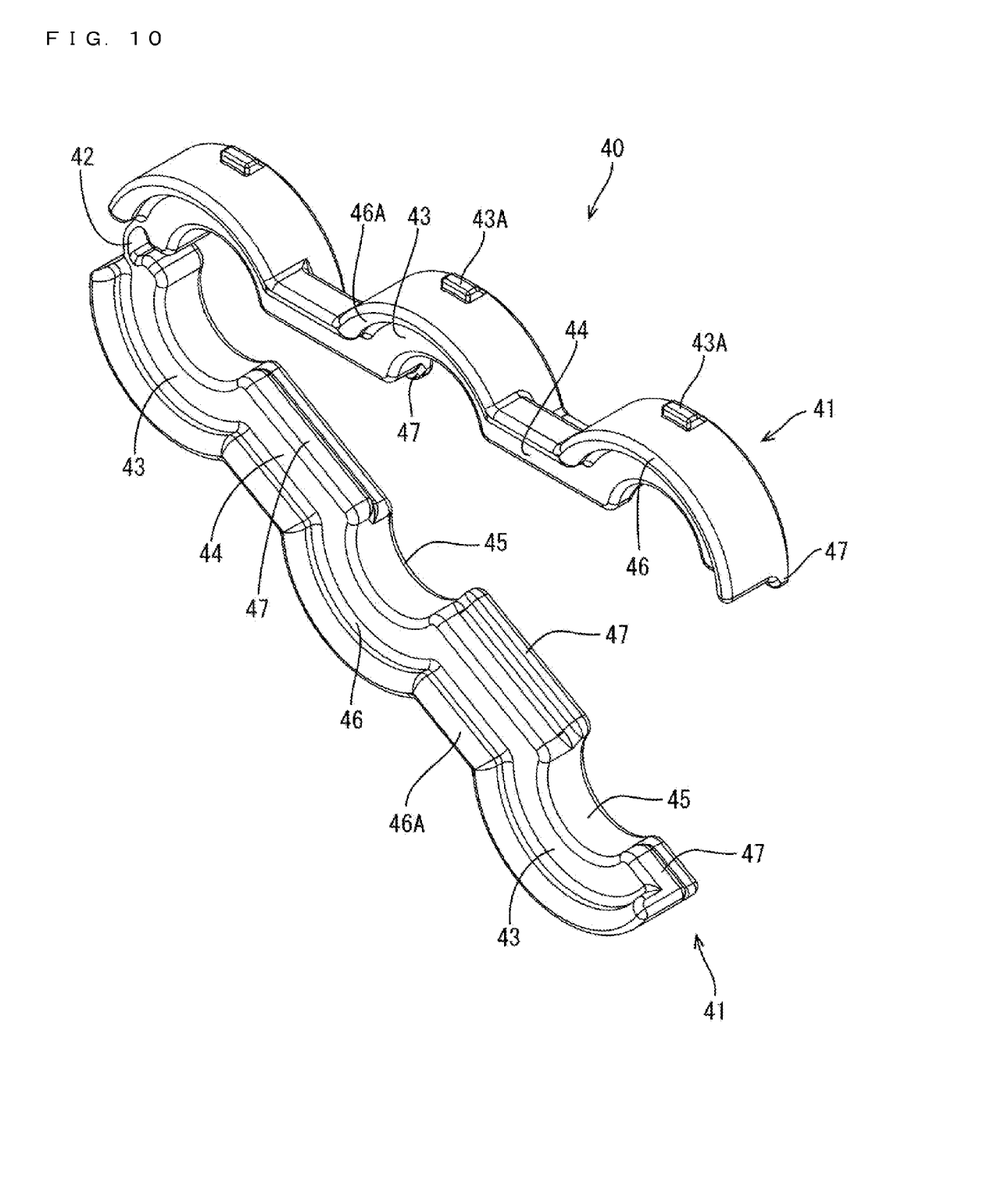
FIG. 10 is a perspective view of the vertically opened back retainer when viewed obliquely from behind.

Upper and lower butting portions 47 are provided at mating positions of the supports 43 and the couplings 44 when the half bodies 41 are assembled and have mating surfaces that are displaced vertically at front and rear sides of the supports 43 and the couplings 44, as shown in FIGS. 9 and 10. The butting portions 47 butt against each other in the front-back direction and the vertical direction when a large force is applied to the wire protecting portions 46, thereby suppressing a mutual displacement of the half bodies 41.

The connector 10 is assembled by inserting the wires W through the rubber plugs 24 and the shield bracket 50 in advance, and the insulation coatings W2 are removed at the ends of the wires W to expose the cores W1. The wire connecting portions 22 of the terminals 20 then are crimped to these exposed cores W1 to connect the terminals 20 to the ends of the respective wires W.

The terminals 20 then are inserted into the respective cavities 37 from behind the housing 30. When the device-side connecting portion 21 projects from the inserting portion 31, the locking lance 38 is fit into the lance hole 23A of the linking portion 23 to hold the terminal 20 in the cavity 37.

The rubber plugs 24 are in the wire draw-out portion 32 when the terminals 20 are held in the cavities 37. The back retainer 40 then is mounted on each wire W to sandwich each wire W vertically between the supports 43. Thus, the rubber plugs 24 are retained by mounting the back retainer 40 into the wire draw-out portion 32 from behind.

The wire draw-out portion 32 then is inserted into the tubular portion 51 from the front to cover the outer periphery of the wire draw-out portion 32 by the tubular portion 51 of the shield bracket 50 fitted on the wires W in advance. The front stop 54 contacts the rear end opening of the wire draw-out portion 32 from behind when the wire draw-out portion 32 is inserted to the proper position into the tubular portion 51 so that the shield bracket 50 is stopped in front with respect to the wire draw-out portion 32.

The locking claws 35A of the lock pieces 35 of the wire draw-out portion 32 move onto the locked portions 53 of the tubular portion 51 in the process of inserting the wire draw-out portion 32 into the tubular portion 51. The lock pieces 35 resiliently restore when the wire draw-out portion 32 is inserted to the proper position into the tubular portion 51 and the locked portions 53 are locked from behind by the locking claws 35A. In this way, the shield bracket 50 is held in the state prevented from coming off from the wire draw-out portion 32 in the front-back direction, and the connector 10 is completed.

The connector 10 is fixed to the case C of the device by inserting the inserting portion 31 of the housing 30 into the mounting hole C1 of the case C so that the mounting pieces 52 of the shield bracket 50 contact an outer surface of the case C. The fixing bolts then are inserted into the bolt insertion holes 52A and tightened into the case C so that the shield bracket 50 is fixed and electrically connected to the case C.

A mounting space for the connector 10 behind the case C may be narrow and each wire W may be drawn out by being bent at a steep angle about the position of the support 43 of the back retainer 40 supports each wire W. If nothing was present between wires drawn out backward from supporting portions and a front stop portion of a tubular portion, the wires would directly contact an end part of the front stop when bent at a steep angle. If the wires vibrate due to the vibration of a vehicle, the end part of the front stop and the wires would rub against each other to damage the wires. However, according to this embodiment, the wire protecting portions 46 of the back retainer 40 project farther back than the front stop portion 54 of the tubular portion 51 and are arranged over the entire circumference along the inner peripheral edge of the front stop 54 in such a manner as to avoid the lock pieces 35 when the shield bracket 50 is held on the wire draw-out portion 32.

The wires W may be bent at a steep angle about the supports 43 that support the respective wires W and may be drawn out vertically, laterally or any direction. Thus, the wires W will contact the curved surfaces 46A of the wire protecting portions 46, as shown in FIG. 5, and will not contact the front stop 54 of the shield bracket 50. This can prevent the wires W from being damaged due to contact with the shield bracket 50. Further, the wire protecting portions 46 are unitary with the back retainer 40, and it is not necessary to provide wire protecting portions separately from the back retainer 40 and an increase in the number of components of the connector 10 can be prevented.

As described above, the supports 43 for supporting the wires W are arranged in the tubular portion 51 of the shield bracket 50 and the wire protecting portions 46 are provided on the rear end surfaces of the supports 43 and the couplings 44 of the back retainer 40. Thus, the drawn out wires W can be bent at a steep angle without damaging the wires W while shortening the length of the part arranged outside the case C in the front-back direction. Further, the curved surfaces 46A on the corners of the wire protecting portions 46 at the side of the wires W reliably prevent damage to the wires W.

Further, since the supporting portions 43 for supporting the wires W are arranged in the tubular portion 51 of the shield bracket 50, the wires W can be bent about the supported parts thereof in the tubular portion 51 of the shield bracket 50. In this way, loads on the wires W can be reduced by bending the wires drawn out backward from the connector 10 at a more moderate angle.

The front stop 54 is provided at the rear end 51A of the tubular portion 51 and contacts the rear opening edge of the wire draw-out portion 32 to stop the shield bracket 50 in front with respect to the wire draw-out portion 32. The front stop 54 is expanded than the inserting portion 31 and is arranged around the wires W drawn out backward from the wire draw-out portion 32. Thus, it is particularly effective to provide the wire protecting portions 46 on the back retainer 40 when providing the front stop 54 on the edge of the rear end opening 51A of the tubular portion 51.

The present invention is not limited to the above described embodiment. For example, the following embodiments are also included in the scope of the invention.

The wire protecting portions 46 are formed continuous in the lateral direction on the supports 43 and the couplings 44 of the back retainer 40 in the above embodiment. However, the wire protecting portions may be provided only on the supports or intermittently on the supports and the couplings.

The wire protecting portions 46 are formed unitarily on the rear end surfaces of the supports 43 and the couplings 44 of the back retainer 40 in the above embodiment. However, a separate wire protecting portion 46 may be mounted on the back retainer 40.

The front stop 54 that contacts the rear end opening edge of the wire draw-out portion 32 is provided on the edge part of the rear end opening 51A of the tubular portion 51 to stop the shield bracket 50 in front with respect to the wire draw-out portion 32 in the above embodiment. However, a front stop for stopping the shield bracket 50 in front with respect to the wire draw-out portion 32 may be formed separately and the rear end edge of the tubular portion 51 may extend straight back.

Although three wires are drawn out backward from the wire draw-out portion 32 in the above embodiment. However, the number of wires drawn out backward from the wire draw-out portion does not matter.

The wires W are drawn out backward from the housing 30 in the above embodiment. However, the wires may be drawn out up, down or laterally from the housing.

Although the wire protecting portions 46 are provided on the back retainer 40 for retaining the rubber plugs 24 fit externally on the respective wires W in the above embodiment. However, a wire protecting portion may be provided on a back retainer for retaining a one-piece rubber plug through which a plurality of wires are collectively inserted.

What is claimed is:

1. A connector to be provided on an end of a wire and mounted on a case of a device, comprising:
    a housing made of synthetic resin and from which the wire is drawn out;
    a shield bracket made of metal and fixed to the case in a state where the shield bracket covers the housing and the wire is drawn out through an opening;
    a seal accommodated in the housing and seals between the housing and the wire;
    a back retainer made of synthetic resin and mounted in the housing to be arranged in the shield bracket in a state where the wire is supported and retains the seal; and
    a wire protector provided on the back retainer at a distance from the wire and projecting out from the opening of the shield bracket.

2. The connector of claim 1, wherein the wire protector is unitary with the back retainer.

3. The connector of claim 2, wherein the wire protector is provided along an edge part of the opening of the shield bracket.

4. The connector of claim 3, wherein:
    the housing includes a wire draw-out portion from which the wire is drawn out backward; and
    a front stop that contacts a rear end part of the wire draw-out portion by projecting inwardly and stops the shield bracket in front with respect to the housing is provided on an edge part of the opening of the shield bracket.

* * * * *